United States Patent
Pao et al.

(10) Patent No.: US 7,777,743 B2
(45) Date of Patent: Aug. 17, 2010

(54) VIEWING MULTI-DIMENSIONAL DATA THROUGH HIERARCHICAL VISUALIZATION

(75) Inventors: Yoh-Han Pao, Cleveland Heights, OH (US); Zhuo Meng, Broadview Heights, OH (US); Baofu Duan, Cleveland Heights, OH (US)

(73) Assignee: Computer Associates Think, Inc., Islandia, NY (US)

( * ) Notice: Subject to any disclaimer, the term of this patent is extended or adjusted under 35 U.S.C. 154(b) by 1231 days.

(21) Appl. No.: 10/402,519

(22) Filed: Mar. 28, 2003

(65) Prior Publication Data

US 2003/0200191 A1 Oct. 23, 2003

Related U.S. Application Data

(60) Provisional application No. 60/374,064, filed on Apr. 19, 2002, provisional application No. 60/374,020, filed on Apr. 19, 2002, provisional application No. 60/374,024, filed on Apr. 19, 2002, provisional application No. 60/374,041, filed on Apr. 19, 2002, provisional application No. 60/373,977, filed on Apr. 19, 2002, provisional application No. 60/373,780, filed on Apr. 19, 2002.

(51) Int. Cl.
*G06T 1/00* (2006.01)
(52) U.S. Cl. .................. 345/428; 707/737; 382/225
(58) Field of Classification Search ......... 345/440–441, 345/619, 633, 620
See application file for complete search history.

(56) References Cited

U.S. PATENT DOCUMENTS

| | | | |
|---|---|---|---|
| 4,193,115 A | 3/1980 | Albus | |
| 4,215,396 A | 7/1980 | Henry et al. | |
| 4,438,497 A | 3/1984 | Willis et al. | |
| 4,649,515 A | 3/1987 | Thompson et al. | |
| 4,663,703 A | 5/1987 | Axelby et al. | |
| 4,670,848 A | 6/1987 | Schramm | |
| 4,740,886 A | 4/1988 | Tanifuji et al. | |
| 4,754,410 A | 6/1988 | Leech et al. | |
| 4,858,147 A | 8/1989 | Conwell | |
| 4,928,484 A | 5/1990 | Peczkowski | |
| 4,972,363 A | 11/1990 | Nguyen et al. | |
| 4,979,126 A | 12/1990 | Pao et al. | |
| 4,994,982 A | 2/1991 | Duranton et al. | |
| 5,023,045 A | 6/1991 | Watanabe et al. | |
| 5,033,006 A | 7/1991 | Ishizuka et al. | 364/513 |
| 5,033,087 A | 7/1991 | Bahl et al. | 381/43 |

(Continued)

OTHER PUBLICATIONS

Bernard Widrow, Rodney G. Winter, and Robert A. Baxter (Jul. 1988) "Layered Neural Nets fo Pattern Recognition", *IEEE Trans. Acoustics, Speech, and Signal Processing*, vol. 36, No. 7, pp. 1109-1118.

(Continued)

*Primary Examiner*—Peter-Anthony Pappas
(74) *Attorney, Agent, or Firm*—Baker Botts L.L.P.

(57) ABSTRACT

A method for hierarchical visualization of multi-dimensional data is provided. A first dimension-reduction process is applied to a multi-dimensional data set to obtain a first visualization. A subset of the multi-dimensional data set associated with a selected region of the dimension-reduced first visualization is selected. A second dimension-reduction process is applied to the selected subset of the multi-dimensional data set to obtain at least one additional visualization.

31 Claims, 7 Drawing Sheets

U.S. PATENT DOCUMENTS

| | | | |
|---|---|---|---|
| 5,052,043 A | 9/1991 | Gaborski | |
| 5,111,531 A | 5/1992 | Grayson et al. | |
| 5,113,483 A | 5/1992 | Keeler et al. | |
| 5,119,468 A | 6/1992 | Owens | |
| 5,140,523 A | 8/1992 | Frankel et al. | |
| 5,142,612 A | 8/1992 | Skeirik | |
| 5,142,665 A | 8/1992 | Bigus | 395/21 |
| 5,163,111 A | 11/1992 | Baji et al. | 395/22 |
| 5,175,678 A | 12/1992 | Frerichs et al. | |
| 5,175,797 A | 12/1992 | Funabashi et al. | |
| 5,247,445 A | 9/1993 | Miyano et al. | |
| 5,311,421 A | 5/1994 | Nomura et al. | |
| 5,335,291 A | 8/1994 | Kramer et al. | |
| 5,349,541 A | 9/1994 | Alexandro et al. | |
| 5,442,778 A * | 8/1995 | Pedersen et al. | 707/5 |
| 5,483,650 A * | 1/1996 | Pedersen et al. | 707/2 |
| 5,485,390 A | 1/1996 | LeClair et al. | |
| 5,682,465 A | 10/1997 | Kil et al. | 395/23 |
| 5,734,796 A | 3/1998 | Pao | |
| 5,761,389 A | 6/1998 | Maeda et al. | 395/75 |
| 5,790,121 A * | 8/1998 | Sklar et al. | 715/853 |
| 5,819,258 A * | 10/1998 | Vaithyanathan et al. | 707/2 |
| 5,822,741 A | 10/1998 | Fischthal | 706/16 |
| 5,835,901 A | 11/1998 | Duvoisin, III et al. | 706/19 |
| 5,848,373 A | 12/1998 | DeLorme et al. | 701/200 |
| 5,848,402 A | 12/1998 | Pao et al. | |
| 5,895,474 A | 4/1999 | Maarek et al. | 707/514 |
| 5,983,224 A | 11/1999 | Singh et al. | 707/6 |
| 5,999,927 A * | 12/1999 | Tukey et al. | 707/5 |
| 6,003,029 A | 12/1999 | Agrawal et al. | 707/7 |
| 6,025,843 A * | 2/2000 | Sklar | 715/841 |
| 6,032,139 A | 2/2000 | Yamaguchi et al. | 706/13 |
| 6,064,996 A | 5/2000 | Yamaguchi et al. | 706/13 |
| 6,122,628 A * | 9/2000 | Castelli et al. | 707/5 |
| 6,128,609 A | 10/2000 | Rose | 706/25 |
| 6,134,537 A | 10/2000 | Pao et al. | |
| 6,134,541 A * | 10/2000 | Castelli et al. | 707/2 |
| 6,236,942 B1 | 5/2001 | Bush | 702/14 |
| 6,269,351 B1 | 7/2001 | Black | 706/12 |
| 6,278,986 B1 | 8/2001 | Kamihira et al. | 706/25 |
| 6,289,354 B1 * | 9/2001 | Aggarwal et al. | 707/104.1 |
| 6,327,550 B1 | 12/2001 | Vinberg et al. | |
| 6,496,812 B1 | 12/2002 | Campaigne et al. | 706/16 |
| 6,496,832 B2 * | 12/2002 | Chi et al. | 707/102 |
| 6,523,026 B1 * | 2/2003 | Gillis | 707/3 |
| 6,629,097 B1 * | 9/2003 | Keith | 707/5 |
| 6,691,045 B1 | 2/2004 | Labute | 702/27 |
| 6,697,791 B2 | 2/2004 | Hellerstein et al. | 706/47 |
| 6,759,010 B2 | 7/2004 | Lewis et al. | 422/82.02 |
| 6,947,042 B2 * | 9/2005 | Brand | 345/428 |
| 6,950,786 B1 * | 9/2005 | Sonneland et al. | 703/2 |
| 7,039,621 B2 * | 5/2006 | Agrafiotis et al. | 706/20 |
| 7,043,403 B1 * | 5/2006 | Wang et al. | 702/185 |
| 7,103,874 B2 | 9/2006 | McCollum et al. | 717/121 |
| 7,174,336 B2 * | 2/2007 | Campos et al. | 707/100 |
| 7,174,343 B2 * | 2/2007 | Campos et al. | 707/102 |
| 7,174,344 B2 * | 2/2007 | Campos et al. | 707/102 |
| 7,265,755 B2 * | 9/2007 | Peterson | 345/440 |
| 2002/0193981 A1 * | 12/2002 | Keung et al. | 704/1 |
| 2003/0200075 A1 | 10/2003 | Meng et al. | 703/22 |
| 2003/0200189 A1 | 10/2003 | Meng et al. | 706/26 |
| 2004/0019574 A1 | 1/2004 | Meng et al. | 706/15 |
| 2004/0133355 A1 | 7/2004 | Schneider | 702/19 |
| 2004/0215430 A1 | 10/2004 | Huddleston et al. | 703/2 |
| 2004/0220900 A1 | 11/2004 | Yang et al. | 707/2 |

OTHER PUBLICATIONS

Yoh-Han Pao, (1989) *Adaptive Pattern Recognition and Neural Networks*.

Andrew G. Barco (1990) "Connectionist Learning for Control", *Neural Networks for Control*, pp. 5-58 (edited by W. Thomas Miller, III, Richard S. Sutton and Paul J. Werbos).

R.D. Coyne and A.G. Postmus (1990) "Spatial Applications of Neural Networks in Computer-aided Design", *Artificial Intelligence in Engineering*, 5(1):9-22.

Kumpati S. Narendra and Kannan Parthasarathy (Mar. 1990) "Identification and Control of Dynamical Systems Using Neural Networks", *IEEE Trans. Neural Networks*, vol. 1, No. 1, pp. 4-27.

Maryhelen Stevenson, Rodney Winter, and Bernard Widrow (Mar. 1990) "Sensitivity of Feedforward Neural Networks to Weight Errors", *IEEE Trans. Neural Networks*, vol. 1, No. 1, pp. 71-80.

Ester Levin, Naftali Tisbhy, and Sara A. Solla (Oct. 1990) "A Statistical Approach to Learning and Generalization in Layered Neural Networks", *Proc. IEEE*, vol. 78, No. 10, pp. 1568-1574.

Les Atlas, Jerome Connor and Mark Damborg (1991) "Comparisons of Conventional Techniques and Neural Network in Computer-aided Design", Artificial Intelligence in Engineering, 5(1):9-22.

Miodrag Djukanov, Borivole Babic, Dijan J. Sobajic and Yob-Han Pao (1991) "Unsupervised/Supervised Learning Concept for 24-Hour Load Forecasting", *Artificial Intelligence in Engineering*, pp. 819-827.

M.M. Gupta and J. Qi (1991) "Fusion of Fuzzy Logic and Neural Networks with Applications to Decision and Control Problems", *Proceedings of the 1991 American Control Conference*, pp. 1:30-31.

Jocelyn Sietsma and Robert J. F. Dow (1991) "Creating Artificial Neural Networks That Generalize", *Neural Networks*, vol. 4, pp. 67-79.

Petros A. Ioannou and Aniruddha Datta (Dec. 1991) "Robust Adaptive Control: A Unified Approach", *Proc. IEEE*, vol. 79, No. 12, pp. 1736-1768.

S.A. Billings, H.B. Jamaluddin and S. Chen (1992) "Properties of neural networks with applications to modeling non-linear dynamical systems", *Int. J. Control*, pp. 55(1):193-224.

John Doleac, Jeff Getchius, Judy Franklin and Chuck Anderson (1992)"Nadaline Connectionist Learing vs-Linear Regression at a Lamp Manufacturing Plant", *Proceedings of The First IEEE Conference on Control Applications*, pp. 552-558.

William Finnoff, Ferdinand Hergert, and Hans Georg Zimmerman (1993) "Improving Model Selection by Nonconvergent Methods", *Neural Networks*, vol. 6, pp. 771-783.

Andreas Ikonompoulos, Lefteri H. Tsoukalas and Robert E. Uhrig (1993) "A Hybrid Neural Networ-Fuzzy Arithmetic Methodology For Performing Virtual Measurements in a Complex System", *Proceedings of the Thirty-Sixth Power Instrumentation Symposium*, pp. 205-212.

Michael Nikolaou (1993) "Neural Network Modeling of Nonlinear Dynamical Systems", *Proceedings of the 1993 American Control Conference*, pp. 1460-1464.

Stevan V. Ordi, Dusan P. Petrovacki, and Gorana A. Krstonosic (1993), "Evolutional Development of a Multilevel Neural Network", *Neural Networks*, vol. 6, pp. 583-595.

Yoh-Han Pao and Gwang-Hoon Park (1993) "Neural-Net Computing for Machine Recognition of Handwritten English Language text", *Fundamentals of Handwriting Recognition*, pp. 335-351.

Mujeeb M. Ahmed (1994) "An Integrated Approach to Distributed Intelligent Control", *Proceedings of the Thirty-Seventh Power Instrumentation Symposium*, pp. 1-15.

Timothy J. Graettinger, Naveen V. Bhat and Jeffrey S. Buck (1994) "Adaptive Control with NeuCOP, the Neural Control and Optimization Package", *IEEE*, pp. 2389-2393.

Yoh-Han Pao (1994) "Process Monitoring and Optimization for Power Systems Applications", *IEEE International Conference on Neural Networks*, pp. 3697-3702.

Percy P.C. Yip and Yoh-Han Pao (1994) "A Guided Evolutionary Computation Technique as Function Optimizer", *Proceeding of First IEEE Conference on Evolutionary Computation*, pp. 628-633.

Stuart J. Russell and Peter Norvig, (1995) "Learning From Observations", *Artificial Intelligence: A Modern Approach*, pp. 525-562.

Mattias Nyberg and Yoh-Han Pao (1995) "Automatic Optimal Design of Fuzzy Systems Based on Universal Approximation and Evolutionary Programming", *Fuzzy Logic and Intelligent Systems*, pp. 311-366 (edited by H.L. Hua and M. Gupta).

Percy P.C. Yip and Yoh-Han Pao (1995) "Combinatorial Optimization with Use of Guided Evolutionary Simulated Annealing", *IEEE Transaction on Neural Networks*, 6(2):290-295.

Yoh-Han Pao (1996) "Dimension Reduction Feature Extraction and Interpretation of Data With Network Computing", *International Journal of Patter Recognition and Artificial Intelligence*, pp. 10(5)521-253.

Yoh-Han Pao and Zhou Meng (1996) "A Perspective on Funtional-Link Computing, Dimension Reduction and Signal/Image Understanding", *Proceedings of 1996 IEEE Signal Processing Society Workshop*, pp. 213-222.

Michael J. A. Berry and Gordon Linoff (1997) *Data Mining Techniques for Marketing, Sales and Customer Support*, Chapters 2, 5 and 12, pp. 17-35, 63-93 and 243-285.

Floriana Esposito, Donato Malerba and Giovanni Semeraro, (May 1997) "A Comparative Analysis of Methods For Pruning Decision Trees", *IEEE Transaction on Pattern Analysis and Machine Intelligence*, 19(5):476-491.

Byung Hwan Jun, Chang Soo Kim, Hong-Yeop Song and JJaihie Kim, (Dec. 1997) "A New Criterion in Selection and Discretization of Attributes for the Generation of Decision Trees", *IEEE Transaction on Pattern Analysis and Machine Intelligence*, 19(12):1371-1375.

Yoh-Han Pao and Chang-Yun Shen (1997) "Visualization of Pattern Data Through Learning of Non-linear Variance-Conserving Dimension-Reduction Mapping", *Pattern Recognition*, 30(10):1705-1717.

Paul S. Bradley, Usama M. Fayyad and Cory A. Reins, (June 1998) "Scaling Clustering Algorithms to Large Databases", Proc. $4^{th}$ Int'l Conf. Knowledge Discovery & Data Mining, pp. 9-15.

Yoh-Han Pao and Zhou Meng (1998) "Visualization and the understanding of multidimensional data", *Engineering Applications of Artificial Intelligence*, 11:659-667.

Sholom M. Weiss and Nitin Indurkhya (1998) *Predictive Data Mining: A Practical Guide*, pp. 119-123 and 136-142.

Michael J. A. Berry and Gordon Linoff, (2000) *Mastering Data Mining The Art and Science of Customer Relationship Management*, pp. 59-64 and 111-121.

Time Koskela (2000) "Decision Trees", http://www.hut.fi/~timoko/treeprogs.html.

Zhou Meng and Yoh-Han Pao (2000) "Visualization and Self-Organization of Multidimensional Data through Equalized Orthogonal Mapping", IEEE Transaction on Neural Networks, pp. 11(4):1031-1038.

Surajit Chaudhuri, Usama Fayyad and Jeff Bernhardt, "Scalable Classification over SQL Databases", *Proceedings of the $15^{th}$ International Conference on Data Engineering*, Mar. 23-26, 1999, Sidney, Australia, pp. 470-479.

Dennis T. Lee, Yoh-Han Pao and Dejan J. Sobajic "Dynamic System Control Using Neural Networks", pp. 25-30.

Yoh-Han Pao "Neural Net Computing for Patter Recognition" *Handbook of Pattern Recognition, and Computer Vision*, pp. 125-162 (edited by C.H. Chen, L.F. Pau and P.S.P. Wang).

Bernard Widrow, Narendra K. Gupta, and Sidhaztha Maitra (Sep. 1973) "Punish/Reward: Learning With a Critic in Adaptive Threshold Systems", *IEEE Trans. Systems, Man and Cybernetics*, vol. SMC-3, No. 5, pp. 455-465.

John A. Hartigan, (1975) "Interpretation and Evaluation of Clusters", *Clustering Algorithms*, pp. 12-14.

Yoh-Han Pao and Dejan J. Sobajic (1987) "Metric Synthesis and Concept Discovery With Connectionist Networks", *1987 IEEE*, pp. 390-395.

Bernard Widrow and Rodney Winter (Mar. 1988) "Neural Nets for Adaptive Filtering and Adaptive Pattern Recognition", *IEEE Computer*, pp. 25-39.

Rassokhin et al., "Nonlinear Mapping of Massive Data Sets by Fuzzy Clustering and Neural Networks", 2000.

Riloff et al., E. Classifying Texts Using Relevancy Signatures, Proceedings of the Workshop on Speech and Natural Language, Feb. 1992, pp. 224-229.

Hamer et al., P. An Artificial Immune System Architecture for Computer Security Applications, IEEE Transactions on Evolutionary Computation, vol. 6, No. 3, Jun. 2002, pp. 252-280.

Neugents Are On The Loose, The E-Business Adviser, Apr./May 2000, at 1.

Raisinghani, et al., An Automated Executive and Managerial Peformance Monitoring, Measurement and Reporting System, Journal of Electronic Commerce Research, vol. 2, No. 1, 2001, pp. 23-31.

Computer Associates, Office of the CTO, White Paper: Comprehensive eBusiness Intelligence, Nov. 26, 2001, pp. 1-10.

"Pythia—The Neural Network Designer", Runtime Software, 2000.

Javier Herrero et al., A Hierarchical Unsupervised Growing Neural Network for Clustering Gene Expression Paterns, Bioinformatics, vol. 17, No. 2, 2001, pp. 126-136.

Hassoun, Fundamentals of Artificial Neural Networks, 1995, MIT Press, (6 pg).

Fahlman et al., "The Cascade-Correlation Learning Architecture", 1990, School of Computer Science.

Hassoun, "Fundamentals of Artificial Neural Networks", 1995, pp. 103-106 (3 pg).

Hai-Lung Hung et al., "Dynamic Hierarchical Self-Organizing Neural Networks", 1994, 0-7803-1901-X/94 IEEE.

Henrique et al., "Model Structure Determination in Neural Network Models", 2000, Elsevier Science Ltd.

Wlodzislaw Duch et al., "Survey of Neural Transfer Functions", 1999, Neural Computing Surveys 2, 163,-212.

William H. Hsu and William M. Pottenger and Michael Weige and Jie. Wu and Ting-Hao Yang, Genetic Algorithms for Selection and Partitioning of Attributes in large-scale Data Mining Problems, Data Mining with Evolutionary Algorithms: Research Directions, pp. 1-6, AAAI Press, Jul. 18, 1999.

Ersoy, O.K. et al., "Parallel, Self-Organizing, Hierarchical Neural Networks" IEEE Transactions on Neural Networks, IEEE Inc., New York, US, vol. 1, No. 2, Jun. 1990, pp. 167-178, XP 000133516, ISSN: 1045-9227.

Mandayam et al., "Application of Wavelet Basis Function Neural Networks to NDE*", 1997.

Orr, "Introduction to Radial Basis Function Networks", Centre for Cognitive Science, 1996.

IBM, "IBM Techical Disclosure Bulletin, Sep. 1985, US", vol. 28, No. 4, "Clustering Deterministic Acoustic Spectral Prototypes with an Adaptive Quadratic Form Using Trace Constraint" (NN85091703) (3 pgs).

Ralambondrainy, "A Conceptual Version of the K-means Algorithm", 1995.

Hassoun, "Fundamentals of Artificial Neural Networks", 1995 (5 pgs).

Bouchard, "New Recursive-least-Squares Algorithms for Nonlinear Active Control of Sound and Vibration Using Neural Networks", 2001.

Patra et al. (Patra), "Functional Link Artificial Neural Network-Based Adaptive Channel Qualizationof Nonlinear Channels with QAM Signal", 1995.

PCT Notification of Transmittal of International Search Report or the Declaration, PCT/US03/11713, Reference 0655/67092; mailed Nov. 8, 2004, Int'l filing date Apr. 15, 2003, and PCT International Search Report (7 pgs).

PCT Notification of Transmittal of International Search Report or the Declaration, PCT/US03/11829, Reference 0655/65206; mailed Aug. 31, 2004, Int'l filing date Apr. 17, 2003, and PCT International Search Report (7 pgs).

*European Patent Office Communication Pursuant to Article 94(3) EPC* for International Application No. 03 721 716.3-1243; 3 pages, Apr. 15, 2009.

\* cited by examiner

VIEWING MULTI-DIMENSIONAL DATA THROUGH HIERARCHICAL VISUALIZATION

CROSS-REFERENCE TO RELATED APPLICATIONS

This application claims the benefit of the following co-pending provisional applications:

(a) Ser. No. 60/374,064, filed Apr. 19, 2002 and entitled "PROCESSING MIXED NUMERIC AND/OR NON-NUMERIC DATA";

(b) Ser. No. 60/374,020, filed Apr. 19, 2002 and entitled "AUTOMATIC NEURAL-NET MODEL GENERATION AND MAINTENANCE";

(c) Ser. No. 60/374,024, filed Apr. 19, 2002 and entitled "VIEWING MULTI-DIMENSIONAL DATA THROUGH HIERARCHICAL VISUALIZATION";

(d) Ser. No. 60/374,041, filed Apr. 19, 2002 and entitled "METHOD AND APPARATUS FOR DISCOVERING EVOLUTIONARY CHANGES WITHIN A SYSTEM";

(e) Ser. No. 60/373,977, filed Apr. 19, 2002 and entitled "AUTOMATIC MODEL MAINTENANCE THROUGH LOCAL NETS"; and (f) Ser. No. 60/373,780, filed Apr. 19, 2002 and entitled "USING NEURAL NETWORKS FOR DATA MINING".

This application incorporates by reference the above mentioned co-pending applications in their respective entireties.

TECHNICAL FIELD

This application relates to processing of multi-dimensional data. In particular, the application relates to analyzing multi-dimensional data through hierarchical visualization.

DESCRIPTION OF RELATED ART

As use of computers and other information and communication appliances proliferate in the current information age, data frequently is collected from numerous sources. Further, large amounts of data exist in many databases. Much of the data is collected for archiving purposes only and therefore, in many instances, are stored without organization. Sifting through the morass of multi-dimensional, and perhaps unorganized, data (which may include non-numerical data) to extract useful information for a specific purpose may be a substantial challenge.

For example, business concerns are finding an increasing need, in order to remain competitive in their business market, to effectively analyze and extract useful information from data they and/or others have collected and use the extracted information to improve operation of the business. This, however, often may be a daunting task. Since collected data typically have many fields (in other words, many dimensions), it is difficult to make sense out of a large body of the multi-dimensional collected data Obtaining answers to a number of questions, such as the following, regarding the multi-dimensional data may facilitate the objective of understanding the data:

(i) Where is a data point located relative to other data points?
(ii) What is the environment around a data point?
(iii) For time series data, how did the system evolve over time?
(iv) How can a system represented by the data be searched?
(v) How can a system represented by the data be optimized?

Distance between data points may provide valuable information relevant to questions (such as the above) regarding the data points. The distance between two data points, in many cases, can be computed easily. Even for non-numerical data, distance or dissimilarity can also be defined and determined.

A data set containing a large number of data points may, however, present a problem. Although pair-wise distances can be computed for each and every pair of data points in the set, the resulting collection of distances also is a large multi-dimensional data set, and is not necessarily easier to interpret than the data points.

Statistics may be used to glean some information from the data set, such as by using market basket analysis to find association rules. Statistical analysis typically only provide, however, information regarding some characteristics of the data set as a whole and leave unanswered questions concerning specific data points, such as questions (i)-(v) above.

Clustering can be used to separate data points in a data set into clusters from which inter-pattern relationships may be inferred. Data points inside the same cluster are generally considered to be, although they are not necessarily, close to each other. For example, such an assumption is misleading for data points away from the center of a cluster. An example is illustrated in FIG. 1. Point A, which is in Cluster 1, is actually much closer to point B in Cluster 2 than to point C in Cluster 1. Therefore, although points A and C are in the same cluster, it may be that points A and B are more similar.

In an analysis of a large data set, a good visualization of the data may play an important role for providing an understanding of the data. FIG. 1 shows an example in which visualization may be a good tool for understanding data. Humans often gather most of their information through visualization. Typically, the amount of information gathered by the visual sense is several times more than those gathered by the other four senses combined. Humans also possess far superior capability in a desired result, such as separation of data points of different classes for a particular region of the multi-dimensional data space.

Another known technique for analyzing multi-dimensional data sets includes selecting two or three fields from the data set and plotting the data points based on the selected fields, and then repeating the selecting and plotting steps for another subset of fields. By examining the plots of corresponding subsets of the fields (i.e. dimensions), some inter-pattern relationship information may be inferred. However, plots of selected dimensions only provide side views (as opposed to views from arbitrary angles) and it is not an easy task to understand the data distribution based on an examination of multiple side views. For example, most people have difficulty understanding a three-view blue print of a moderately complex machine part.

Therefore, relationships between data points in a multi-dimensional data set cannot be easily understood through the above-described and conventional visualization techniques.

There is a great need for visualization methodologies that provide intelligible views of multi-dimensional data as a whole as well as details of the data.

SUMMARY

The present application provides a method for hierarchical visualization of multi-dimensional data. In one embodiment, the method includes (a) applying a first dimension-reduction process to a multi-dimensional data set to obtain a first visualization, (b) selecting a subset of the multi-dimensional data set associated with a selected region of the dimension-reduced first visualization, and (c) applying a second dimension-reduction process to the selected subset of the multi-dimensional data set to obtain at least one additional visualization.

The additional visualization typically is at a higher level of detail than the first visualization. A sequence of more detailed visualizations may be obtained by repeating (b) and (c) for a further subset (i.e., selecting a subset of the subset), until a sufficiently detailed, dimension-reduced visualization having a desired level of separation of points is obtained. For example, a further subset associated with a subregion of the selected region may be selected, and then (b) and (c) are repeated for the further subset. The subregion associated with the further subset may include a mixed portion. A view of the whole or part of this multi-dimensional data set may be obtained at "an angle of view" associated with the sufficiently detailed visualization which may be advantageous for a specific purpose. The first visualization may have one angle of view, and the additional visualization may have a different angle of view.

The second dimension-reduction process may apply the same dimension-reduction technique as used in the first dimension-reduction process. Alternatively, the first dimension-reduction process and the second dimension-reduction process may apply respective different dimension-reduction techniques.

The dimension-reduction process may include applying a continuous dimension-reduction technique to obtain a sequence of dimension-reduced visualizations. The method may further include selecting any two data points in the multi-dimensional data set for distance estimation. If the two points appear to be far apart in any one of the visualizations, they are far apart in the original multi-dimensional space. In particular, the largest one of the reduced-dimension distances is a lower bound estimate of the actual distance in the original space, if PCA (principal component analysis) is used as the dimension-reduction technique.

The method may further include utilizing a hierarchical cluster tree to automate the generation of hierarchical visualizations by generating a visualization for each node of the cluster tree on an as-needed basis, e.g., if the cluster still contains mixed-class patterns for a classification problem.

The multi-dimensional data set, which may include non-numeric data, may be preprocessed into numerical form prior to dimension reduction.

The additional visualization may be consulted with multi-dimensional data from a test set (or other additional multi-dimensional data, such as recently collected data) by applying a mapping corresponding to the second dimension-reduction process.

The resulting visualizations are useful in many task areas such as classification, categorization, process monitoring, search and optimization, etc., both in terms of preprocessing for a more quantitative method and validation of results from another method.

For example, the method may be applied to classify a multi-dimensional data set according to one or more features associated with the data set. As another example, a multi-dimensional data set may be collected from a production process, and the method is applied to obtain information for predicting product properties.

Further, the multi-dimensional data set may correspond to data collected from a system. The method may be applied to obtain information for diagnosing a problem in the system or for predicting a problem, before the problem develops in the system. Alternatively (or additionally), the method may be applied to obtain information for optimizing or searching the system.

BRIEF DESCRIPTION OF THE DRAWINGS

The features of the present application can be more readily understood from the following detailed description with reference to the accompanying drawings wherein.

DETAILED DESCRIPTION

Figure 1:
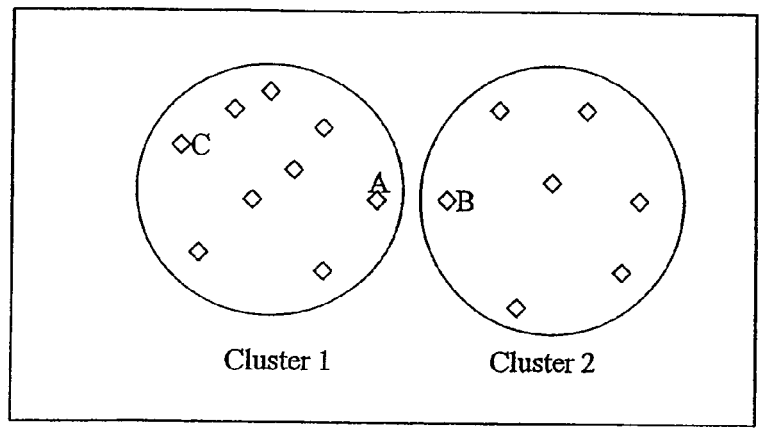
FIG. 1 shows a diagram of clusters in an exemplary two-dimensional data space.

The present disclosure provides tools (in the form of methodologies and systems) for analyzing a multi-dimensional data set through hierarchical visualization (herein referred as "hierarchical visualization methodologies").

The hierarchical visualization methodologies include a sequence of two or more dimension-reduced visualizations at respective levels of detail. Data points (e.g., a subset) in a region of a visualization can be separated out and a new visualization of the subset of data can be generated through a dimension-reduction technique. The process of separating out a portion of the data points and generating a visualization of the group of data points through dimension-reduction may be repeated for a sub-region of the new visualization (i.e., subset of the subset) until a desired level of detail (e.g., separation of points) is obtained. The sequence of visualizations are organized into a hierarchy (discussed below) and forms an instance of hierarchical visualization. Each visualization in the hierarchy has an associated angle of view and may provide increasingly better determination power for a specific task. Although a visualization in the hierarchy may be based on a subset of the data in the data set, the whole data set may be viewed through an angle of view associated with the particular dimension-reduced visualization, which in some cases may provide a better overall view (of the entire data set) for specific purposes.

The hierarchical visualization methodologies may be applied to task domains in which one-shot visualization are applied conventionally. Use of hierarchical visualization may provide new information, which may lead to better determination capability than a one-shot technique. Hierarchical visualization can provide the information in a desired level of detail and its computational complexity is not much more than a one-shot visualization since only regions of interest (usually, mixed regions, e.g., regions in which points in different categories are mixed together) are recursively processed.

Through hierarchical visualization, questions such as the sample questions (i)-(v) above may be answered (or at least hints to an answer may be evident). The first three questions [(i)-(iii)] can be answered quite straightforwardly through hierarchical visualization. Searching usually involves finding close points around a selected cue, which may also be assisted by looking at the neighboring points. At least hints to an answer to the last question [(v)] may be obtained by using sensitivity analysis with hierarchical visualization. Sensitivity analysis involves changing the value of one field while holding the values of the other fields and monitoring changes to the data points.

A non-exhaustive list of dimension-reduction techniques which may be used includes the linear principal component analysis (PCA) through the Karhunen-Loève (K-L) transform, neural-net implementations of PCA, self-organizing map (SOM), the auto-associative mapping technique, the generative topographic mapping (GTM), the nonlinear variance-conserving (NLVC) mapping and the equalized orthogonal mapping (EOM), which are described in commonly-assigned U.S. Pat. Nos. 5,734,796, 6,134,537 and 6,212,509, incorporated herein in their entirety by reference, as well as Sammon's nonlinear mapping and its neural-net implementation, described in J. W. Sammon Jr, "A nonlinear mapping for data structure analysis," *IEEE Trans. Comput.*, vol. C-18, pp. 401-409, 1969, and the distance ratio constrained (DRC) mapping, described in Y. H. Pao and Z. Meng, "Visualization and the understanding of multidimensional data," *Eng. Applicat. Artif. Intell.*, vol. 11, pp. 659-667, 1998.

Hierarchical visualization may be an effective technique to obtain inter-pattern position relationship information of patterns in high dimensional data sets. When a continuous dimension-reduction technique is used, if two data points appear to be far apart in any one of the visualizations in the hierarchy, they are far apart in the original data space. In particular, as discussed below, if PCA is used as the dimension-reduction technique, the greatest distance (between two selected data points) in the visualizations in a hierarchy is deemed the lower bound of the true distance between the two data points in the original data space.

Data points in a visualization may be decorated/annotated with properties, characteristics, features, etc. A sequence of visualizations facilitates separation of data points of different classes, properties, characteristics, features, etc., for a particular region of the multi-dimensional data space.

Figure 2A:
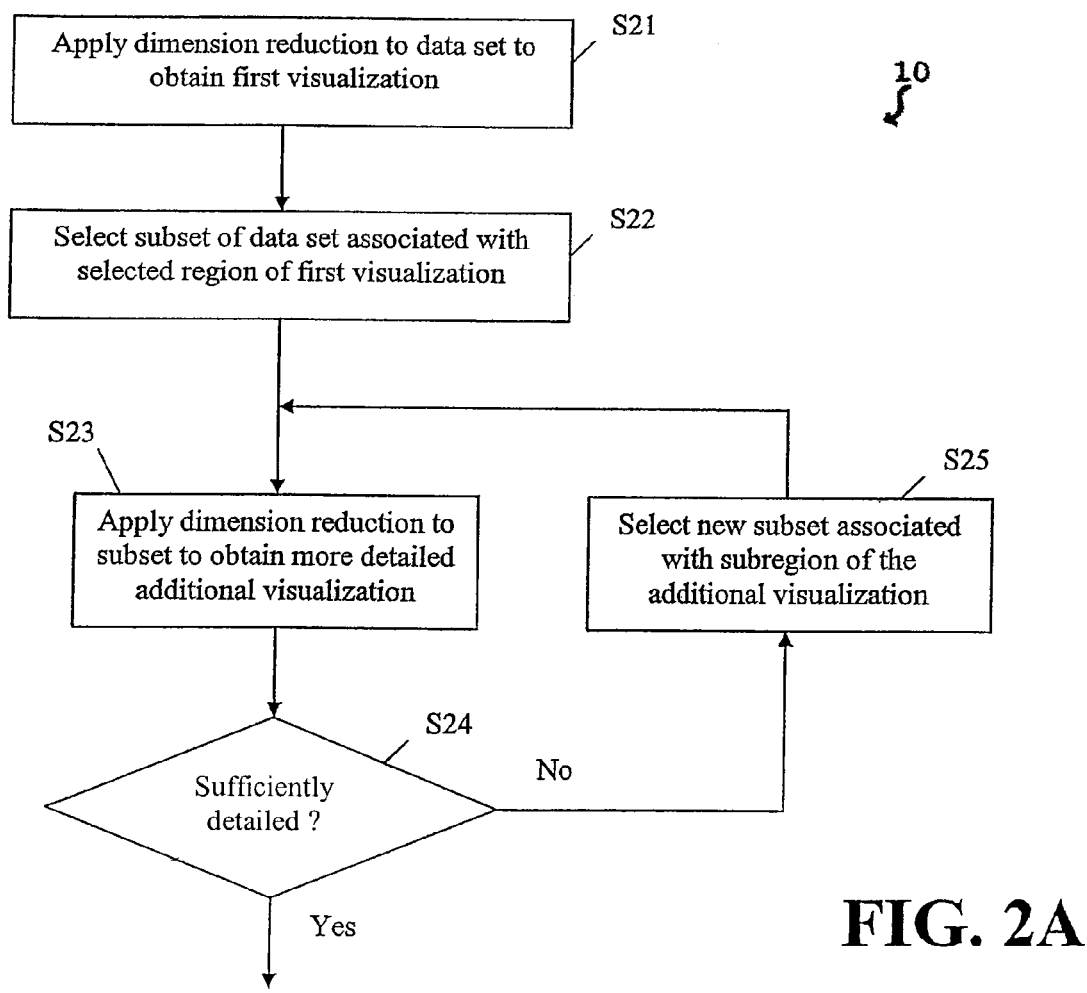
FIG. 2A shows a flow chart of a method, according to one embodiment of the present disclosure, for hierarchical visualization of multi-dimensional data.

A method for hierarchical visualization of multidimensional data, in accordance with one embodiment 10, will be described with reference to FIG. 2A. A first dimension-reduction process is applied to a multidimensional data set to obtain a first visualization (step S21). A region of the dimension-reduced first visualization is selected and a subset of the multidimensional data set associated with the selected region of the dimension-reduced first visualization is determined (step S22). A second dimension-reduction process is applied to the subset of data to obtain an additional visualization (step S23). If the additional dimension-reduced visualization is not sufficiently detailed (step S24), a further subset, associated with a subregion of the additional dimension-reduced visualization, is selected (step S25), and the dimension-reduction process is applied to the further subset to obtain a more detailed visualization (step S23).

The second dimension-reduction process may apply the same dimension-reduction technique as used in the first dimension-reduction process. Alternatively, the first dimension-reduction process and the second dimension-reduction process may apply respectively different dimension-reduction techniques.

Acceptable visualization of multi-dimensional data may be obtained through dimension-reduction techniques. Although the data in many instances appear to be high dimension, it is likely that many fields are not totally independent of each other. Changes in many fields may be attributed to changes to a few parameters, which may not even be present in the data set.

For example, when the Federal Reserve Board changes the interest rate, the interest rate change in most instances affects many business activities which results in changes to many fields of many data sets. In these exemplary circumstances, the cause for the changes to many data fields is merely a single Federal Reserve Board decision. Typically, there is no provision for annotating the collected data with the cause of data changes (for example, the Federal Reserve Board decision).

Dimension-reduction techniques are typically used to extract deciding parts from high dimension data. Reduced dimension data may then be plotted. While almost any dimension-reduction technique can be used to obtain a visualization of the data, a single generated view is not necessarily suitable for a selected purpose (for example, classification). The deciding part of the high dimensional data in many instances cannot be fully represented through a single 2-D or 3-D visualization. Furthermore, a single view of the whole data set is not likely to produce a correct emphasis of a desired portion of the deciding part of multi-dimensional data which causes the data points to separate into desired classes.

To mitigate the dilemma described in the paragraph above, hierarchical visualization methodologies are provided by the present disclosure. The hierarchical visualization methodologies, according to one embodiment, start with a single view of the whole data set by using an appropriate dimension-reduction technique. At a high level, while some portions of the map may already bear the desired characteristics (e.g., separation of points in different categories in a classification problem), it is likely that the resulting mapping for one or more other regions are not yet satisfactory (e.g., points in different categories are still mixed together). For a mixed region, a subset of data points which are in the region may be singled out and a new visualization of the subset may be generated. It is different from zooming-in in the original visualization since the parameters in the new visualization are tuned to the data points in the selected region only.

If more than one region in any generated visualization are to be reprocessed, sequences of visualizations may be generated from that point. The set of visualizations at different levels of detail form the hierarchical visualization. However, although a visualization in the hierarchy is based on a subset of data, the whole data set may be viewed through an angle of view associated with the visualization, which in some cases provides a better overall view for specific purposes.

The process of singling out a subset of interest and generating a new visualization of the subset may be repeated for a region of the new visualization until a desired level of detail with sufficient separation of points is obtained. To obtain finer inter-pattern relationship representation, a continuous dimension-reduction methodology such as the K-L transform or EOM may be used. When a continuous dimension-reduction technique is used to generate the visualizations, if two data points appear to be far apart in any one of the visualizations in the hierarchy, they are indeed far apart in the original data space, although the reverse is not generally true. Therefore, if linear PCA is used in the continuous dimension-reduction method, the largest distance between any two selected points shown in all of the visualizations in the hierarchy may be used as a lower bound of the true distance between them in the original space.

The proof of the above proposition is quite straightforward. For points p1, p2 in the data set, the coordinates in the original space are $[x_{11}, x_{12}, \ldots, x_{1n}]$ and $[x_{21}, x_{22}, \ldots, x_{2n}]$, respectively, and the coordinates in the transformed space are $[y_{11}, y_{12}, \ldots y_{1n}]$ and $[y_{21}, y_{22}, \ldots, y_{2n}]$. The transformed space may be generated using the K-L transform which yields a visualization that provides the largest distance d between the two points and a sequence of the y coordinates corresponds to a descending order of the principal components. Since K-L transform is distance invariant, Equation (1) as follows is true (n is the number of dimensions in the original space):

$$d = \sqrt{(x_{21} - x_{11})^2 + (x_{22} - x_{12})^2 + \ldots + (x_{2n} - x_{1n})^2} \quad (1)$$
$$= \sqrt{(y_{21} - y_{11})^2 + (y_{22} - y_{12})^2 + \ldots + (y_{2n} - y_{1n})^2}$$

A distance d' between the two points on the reduced-dimension visualization is expressed in Equation (2) as follows (m is the number of dimensions in the reduced space):

$$d' = \sqrt{(y_{21} - y_{11})^2 + (y_{22} - y_{12})^2 + \ldots + (y_{2n} - y_{1n})^2} \quad (2)$$

Since m<n, it follows that d'<d, i.e. d' is a lower bound of d.

While the mixed regions may be manually selected according to one embodiment, hierarchical visualizations may be generated automatically, according to another embodiment, by utilizing a hierarchical cluster tree and generating a visualization for each node of the cluster tree on an as-needed basis (for example, if the cluster still contains mixed-class patterns for a classification problem). An advantage is that unattended processing can be carried out. However, because the configuration of the hierarchical clustering may be less than optimal, a greater-than-necessary number of visualizations for regions of less interest may be generated in some instances, while less-than-enough visualizations are generated in some other instances. Cluster tree and other clustering (and decision tree) techniques are discussed in commonly-assigned U.S. Provisional Applications No. 60/374,020, entitled "AUTOMATIC NEURAL-NET MODEL GENERATION AND MAINTENANCE", No. 60/374,041, entitled "METHOD AND APPARATUS FOR DISCOVERING EVOLUTIONARY CHANGES WITHIN A SYSTEM", and No. 60/373,977, entitled "AUTOMATIC MODEL MAINTENANCE THROUGH LOCAL NETS".

Figure 2B:
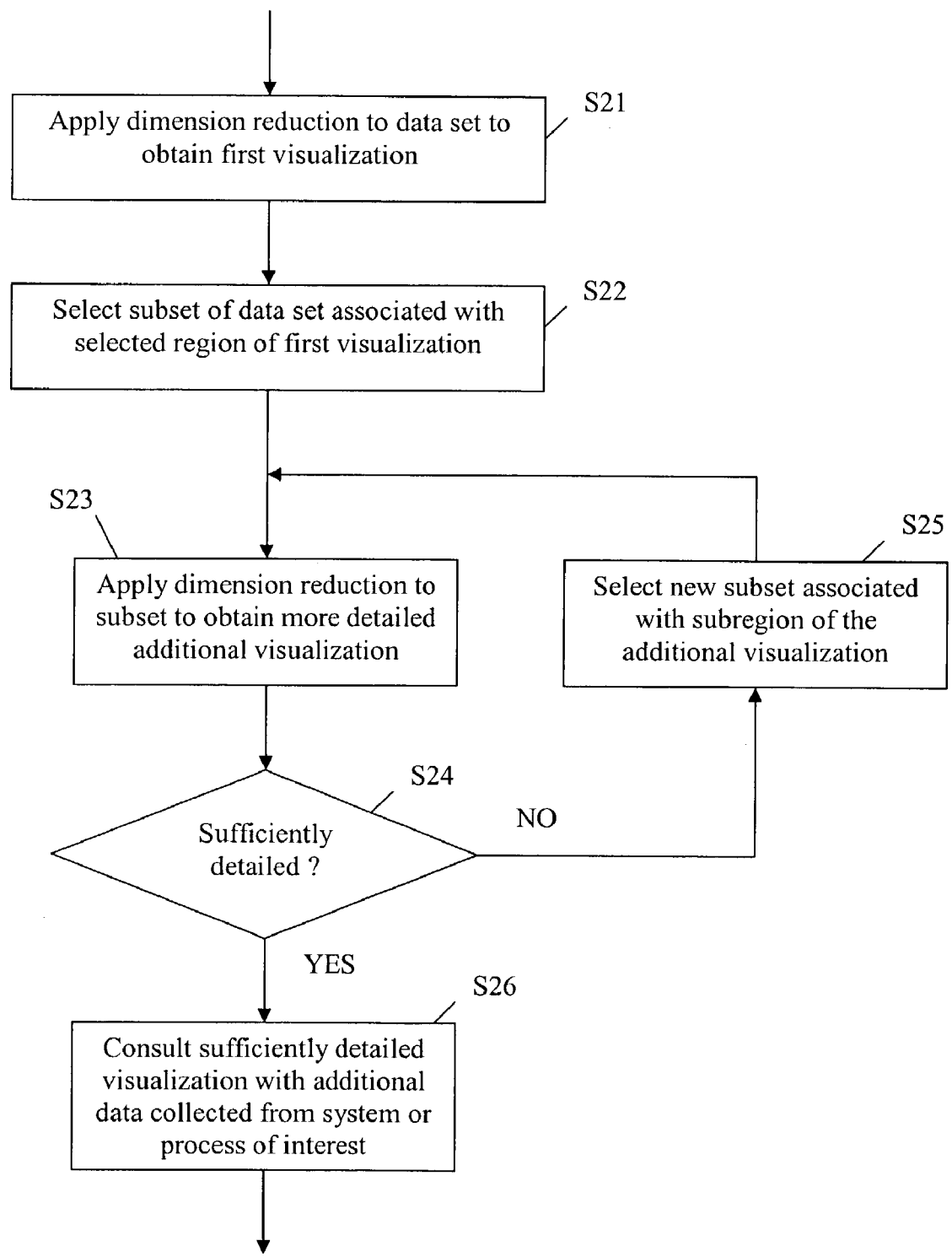
FIG. 2B shows a flow chart of a method for hierarchical visualization of multi-dimensional data, according to another embodiment.

In many instances the multidimensional data set is the data of interest and is the ultimate subject of the visualization task. However, in other instances, an initial data set (for example, historical data which were collected from a system or process which is now monitored) may be used off-line for identifying, through the hierarchical visualization methodologies, a suitable reduced-dimension visualization with associated angle of view. The visualization with associated angle of view may then be consulted on-line with additional data which is collected from the process or system of interest (see, for example, FIG. 2B, step S26). The consultation may be used, for example, to diagnose or predict a problem in the process or system, or to optimize the process or system.

Compared with a one-shot visualization technique, hierarchical visualization has the clear advantage of providing more detailed information on demand. Furthermore, hierarchical visualization is not much more computationally intensive than the underlying dimension-reduction method which may also be used in one-shot visualization, since only the mixed regions are to be recursively processed.

As with a one-shot visualization technique, hierarchical visualization may be applied to many tasks in areas such as classification, categorization, process monitoring and optimization, etc. Hierarchical visualization is especially suited for qualitative estimation and determination. In particular, the advantage of easy estimation of the distribution of solutions from a visualization makes it very useful in selecting ranges of operation for subsequent more quantitative processing methods. When a proposed solution point is plotted on the visualization map, its stability may also be quickly estimated from the characteristics of its neighboring points. Additional applications of visualization methodologies are described and/or suggested in commonly-assigned U.S. Pat. Nos. 5,734,796, 6,134,537 and 6,212,509, which are incorporated herein in their entirety by reference.

Some examples are discussed below. The examples are provide to aid in an understanding of the subject matter of this disclosure but are not intended to, and should not be construed to, limit in any way the claims which follow thereafter.

COMPOUND FORMATION EXAMPLE

The first example concerns a problem of predicting compound formation with three ingredient elements. Five attributes of each element form the 15-featured data set. The five attributes are electro-negativity, number of valence electrons, Mendeleev number, melting temperature and Zunger radius.

Figure 3A:
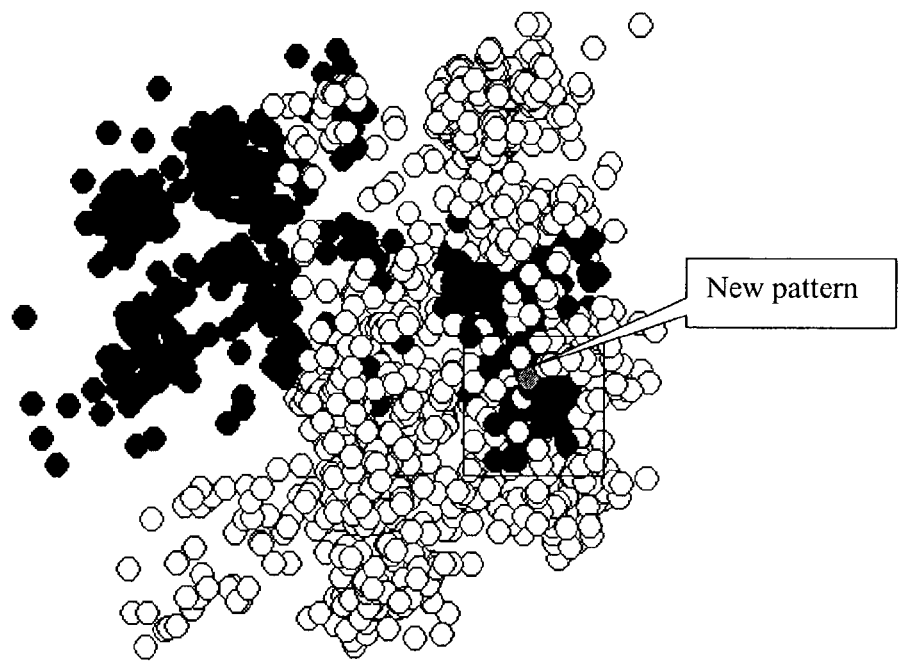
FIG. 3A shows a diagram of a visualization of an exemplary multi-dimensional data set.

FIG. 3A shows a specific 2-D visualization of the data set. In the map of FIG. 3A, compound forming patterns (referred herein as "formers") are denoted with open circles. The non-formers are denoted with solid black circles. Some areas are dominated by formers or by non-formers. If an unknown pattern falls into one of these areas, it is easy to determine whether the new pattern is a former or a non-former. However, there are also mixed areas. A gray circle, indicating a new pattern, is located in a mixed area. Whether it is a former or a non-former cannot be determined yet. Therefore, the single visualization, as illustrated in FIG. 3A, is not enough to solve the classification problem. In order to make a determination regarding the gray circle pattern, hierarchical visualization is applied.

Figure 3B:
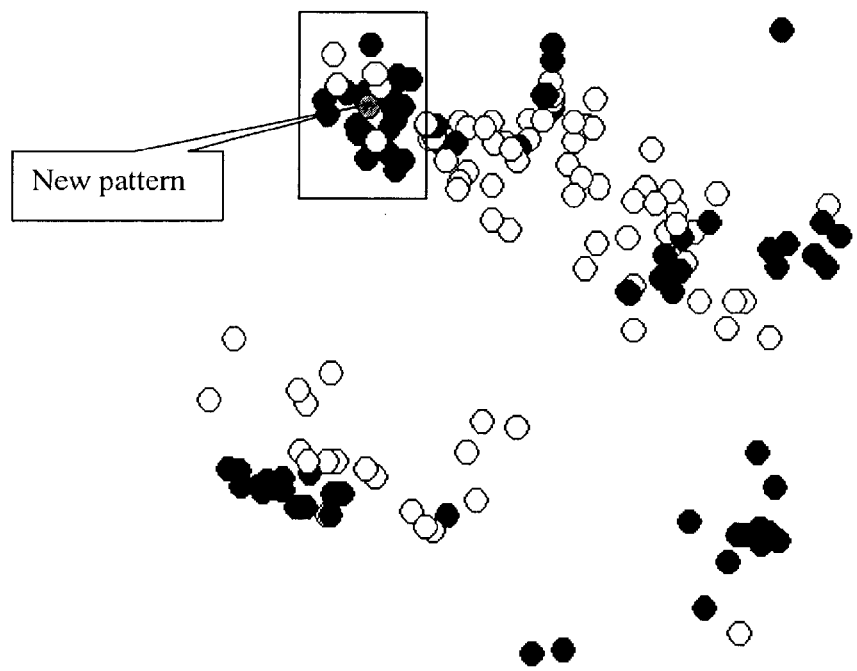
FIG. 3B shows a diagram of a dimension-reduced visualization of a region of the visualization shown in FIG. 3A.

The patterns that are inside the rectangular box around the new pattern shown in FIG. 3A are selected and a new visualization is generated, which is shown in FIG. 3B. Although FIG. 3B shows some further separation of the patterns into the two classes, the new pattern is still in a mixed area, which is delimited by a rectangular box.

Figure 3C:
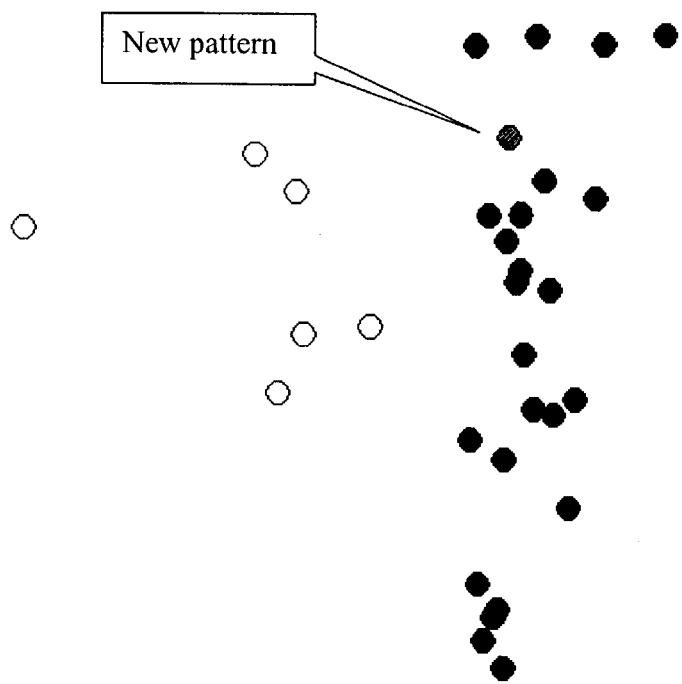
FIG. 3C shows a diagram of a dimension-reduced visualization of a subregion of the visualization shown in FIG. 3B.

A recursive application of hierarchical visualization on data points that are inside the rectangular box shown in FIG. 3B generates a new visualization illustrated in FIG. 3C. From FIG. 3C, it is clear that the new pattern falls inside the area of non-formers and it is more likely to be a non-former. The actual class of the pattern is indeed non-compound forming.

NEWS EXAMPLE

The second example involves classification of selected stories from a library of news stories. The data set is generated by randomly selecting stories out of three topical categories from the news stories library. The three topic categories are "crude," "earn" and "ship." These three topics were selected since (a) they are among the few topics with over a hundred stories in the library and (b) they seem to be relatively distant in concept and hence one might expect them to be separable when visualized. The stories were separated into a training set and a test set. Since the original data are not in numerical form, they may be preprocessed using signpost transformation methodologies, discussed in commonly-assigned U.S. Provisional Patent Application No. 60/374,064 entitled "PROCESSING MIXED NUMERIC AND/OR NON-NUMERIC DATA", which is incorporated herein by reference.

Figure 4A:
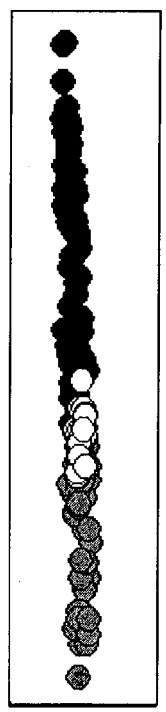
FIG. 4A shows a diagram of a visualization of a second exemplary multi-dimensional data set.
Figure 4A:

The visualization obtained using the stories in the training set is illustrated in FIG. 4A. The black circles represent stories of topic "earn", and the gray and open circles represent stories of topics "crude" and "ship", respectively. FIG. 4A shows two distinct groups, with stories of all three topics in each group. Within each group, some separation of stories based on topics may be observed. The small group represents all stories with only a title and no body words. The high-level visualization of FIG. 4A apparently emphasized a difference between whether a story contains words in its body or not. However, the goal is to distinguish stories of different topics and therefore hierarchical visualization is applied.

Figure 4B:
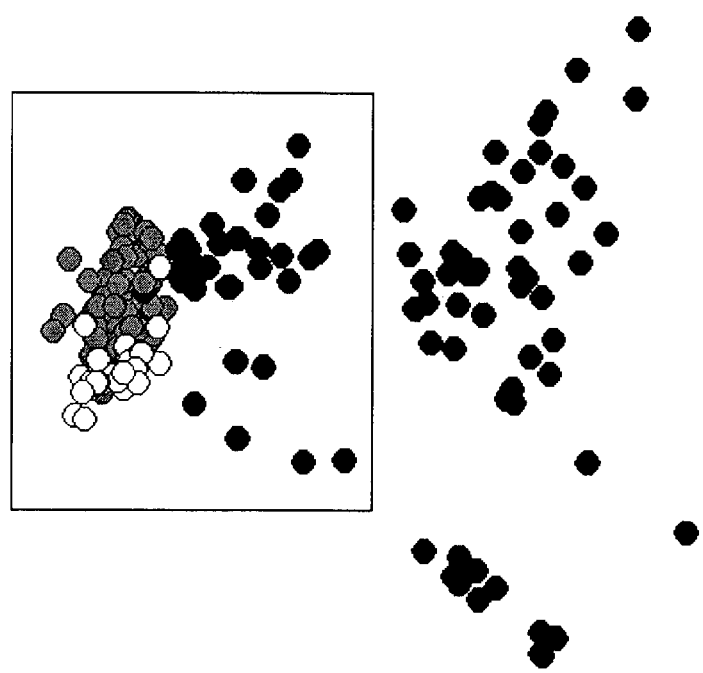
FIG. 4B shows a diagram of a dimension-reduced visualization of a region of the visualization shown in FIG. 4A.
Figure 4C:
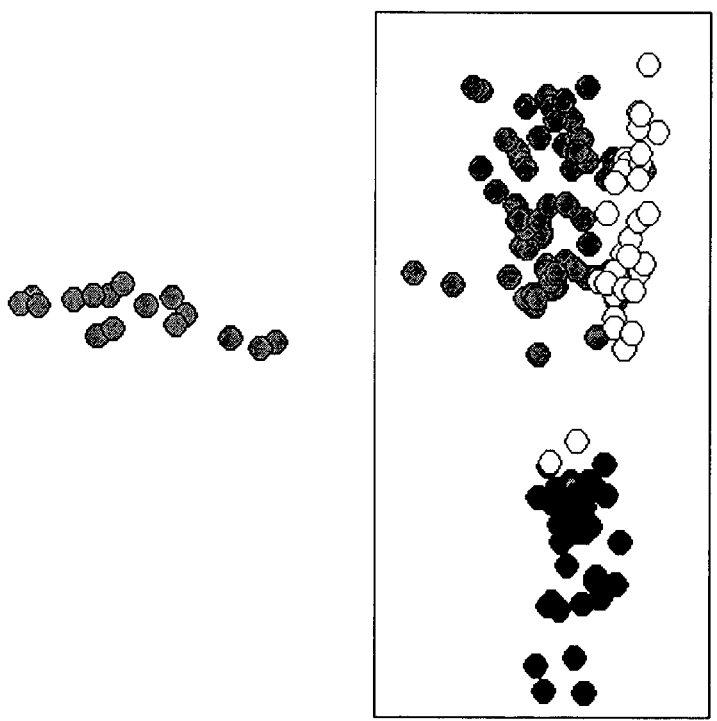
FIG. 4C shows a diagram of a dimension-reduced visualization of a subregion of the visualization shown in FIG. 4B.
Figure 4D:
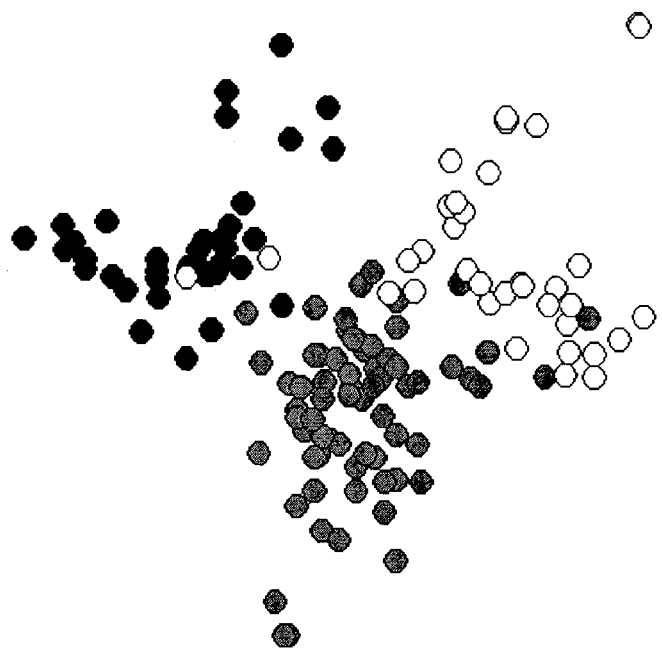
FIG. 4D shows a diagram of a dimension-reduced visualization of a subregion of the visualization shown in FIG. 4C.

FIGS. 4B through 4D show three successive levels of hierarchical visualization, each generated using patterns in a selected region of the previous visualization. Better separation of stories of different topics may be achieved as a more localized region was selected. FIG. 4B shows a new visualization based on patterns that are in a rectangular box shown in FIG. 4A. Stories of topics "crude" and "ship" and some of "earn" are still mixed in the visualization shown in FIG. 4B.

FIG. 4C shows a new visualization, at a higher level of detail, of patterns that are in a rectangular box shown in FIG. 4B. Separation of stories based on topics is more evident. However, stories of topic "ship" and some of topics "crude" and "earn" are still shown to be close to each other.

FIG. 4D shows a new visualization, at an even higher level of detail, of patterns inside a rectangular box shown in FIG. 4C. Separation of stories based on topics is well established with only a few exceptions.

Figure 4E:
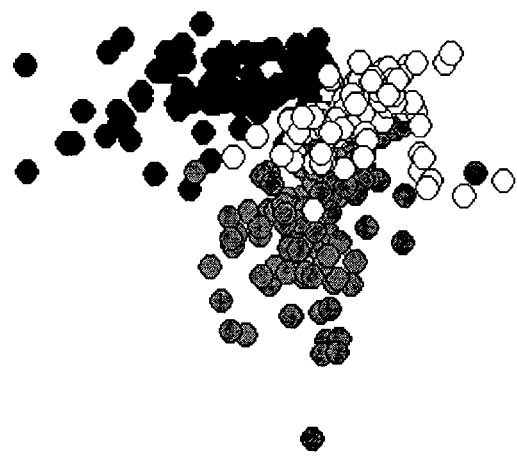
FIG. 4E shows a diagram of a consultation of the visualization shown in FIG. 4D, with data from a test set.

The visualization shown in FIG. 4D was consulted with data from the test set. FIG. 4E is a visualization of the patterns in the test data set using the same mapping as in FIG. 4D. Separation of stories of different topics similar to that in FIG. 4D is evident. It may be seen that although the mapping in FIG. 4D is based on only a portion of the data set, the particular angle of view associated with the visualization is actually better for the purpose of predicting the topic of a story then a view based on all the patterns. The same type of separation of stories of different topics as shown in FIG. 4D may again be observed with new stories.

The examples discussed above demonstrate that the advantages of easy estimation of distribution of solutions and stability of a solution which are provided through hierarchical visualization may be expanded into previously undeterminable problems.

For example, much of the morass of data in the current information age is mixed data which includes non-numeric data. The analysis of mixed data may be very difficult, particularly when the data are from different sources. Very different non-numeric data patterns may have similar meaning and/or effect. As discussed above, hierarchical visualization may be used, after mixed data are preprocessed through signpost transformation into numerical form, to obtain a more intelligible, reduced-dimension visualization of the data.

As another example, process (or system) monitoring often is a difficult task which involves examination of multi-dimensional data (such as collected from a process or system in an enterprise environment). As demonstrated by the compound formation example, the hierarchical visualization methodologies may be applied to make predictions regarding properties of products produced through a process or system. Furthermore, in many instances, it would be very useful for making adjustments to, for example, setpoints of the process or system, when (or ideally before) a problem arises in the process or system, by diagnosing or predicting such problem based on examination of multi-dimensional process data samples. Hierarchical visualization may be used (e.g., offline) with historical process data to identify a dimension-reduced visualization, with associated angle of view, of the process data which permits ready diagnosis or prediction of problems. The visualization with the associated angle of view may then be deployed in an on-line system for consultation with real time (or pseudo real time) process data.

Hierarchical visualization also may be useful in other phases of a business cycle in which multi-dimensional data are analyzed, including design, engineering, development, marketing, sales, training, support and customer support. In addition, analysis of multi-dimensional data in a variety of industries, including retail, technology, automotive, financial services, healthcare and medical, ebusiness, etc., may be aided through use of the hierarchical visualization methodologies.

The hierarchical visualization methodologies of this disclosure may be incorporated in, for example, software-implemented systems, and may be embodied in one or more computer programs or software modules stored on a conventional program storage device or computer readable medium, and/or transmitted via a computer network or other transmission medium. The hierarchical visualization methodologies may be integrated with graphical modeling and/or presentation programs which provide perspective selectivity (for example, rotationally) through user interaction. Thus, the user can view the reduced-dimension (e.g., 3-D) visualization of the multi-dimensional data set from a user selected perspective.

Figure 5:
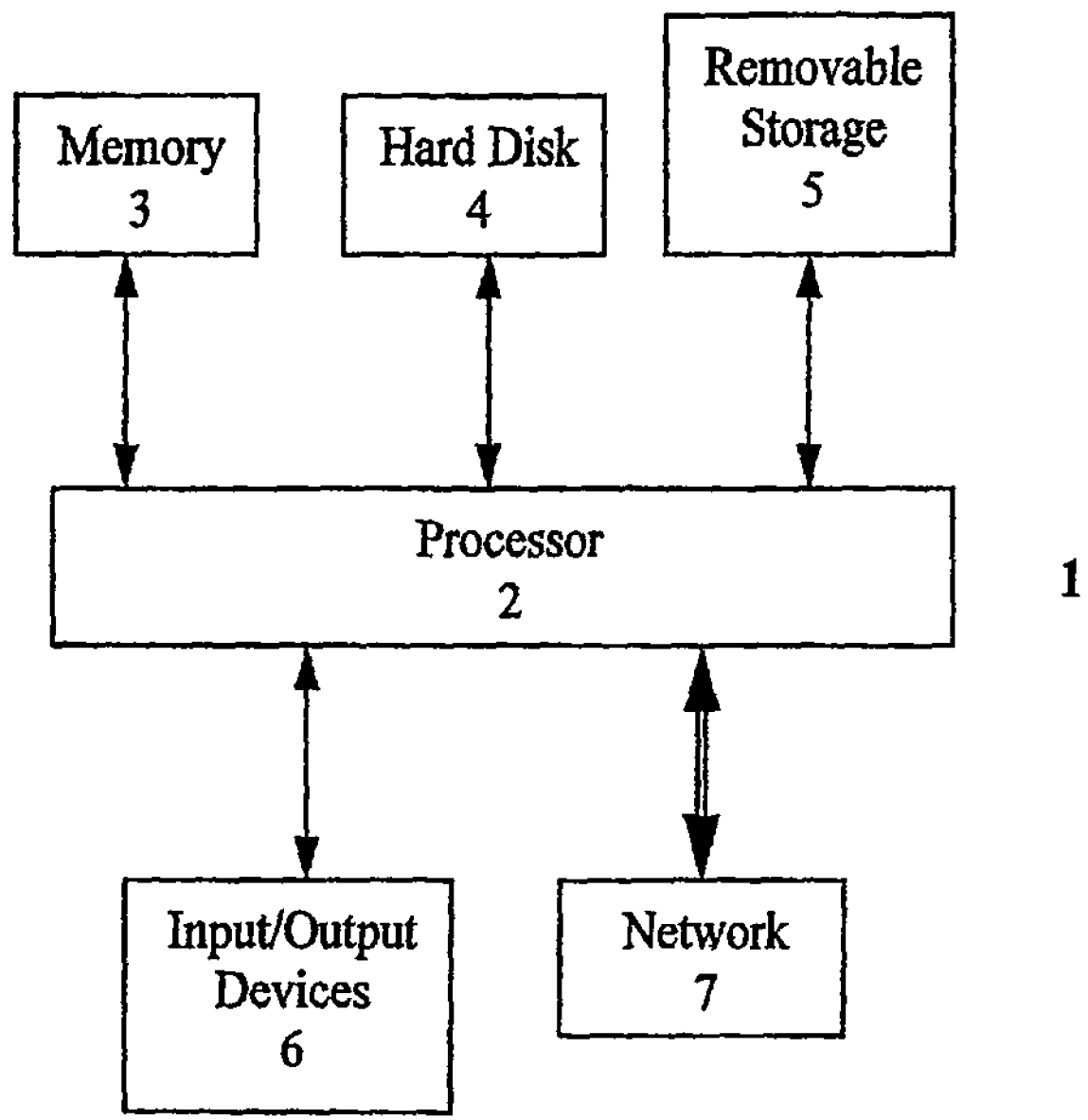
FIG. 5 shows a block diagram of a typical computer system in which a software embodiment of the claimed method for hierarchical visualization of multidimensional data may reside and/or execute.

FIG. 5 illustrates a computer system 1 on which computer executable code such as a software embodiment of the claimed method for hierarchical visualization of multidimensional data similar to embodiment 10 (FIG. 2A) may execute and/or reside. Computer system 1 comprises a processor 2, a memory 3, a hard disk 4, a removable storage drive 5 capable of reading/accessing removable storage media (e.g., floppy disks, compact discs, DVD's, etc.), a number of I/O devices 6 (e.g., a display, a keyboard, a mouse, a microphone, a speaker, etc.), and a connection to a network 7 (e.g., a local area network (LAN), a wide area network (WAN), a storage area network (SAN), an intranet, an extranet, the Internet, and any other computer network(s), telecommunicative network(s), or any combination of such networks). Computer system 1 may be any computing system or device known in the art (e.g., a personal computer, a laptop, a workstation computer, a mainframe computer, etc.). Data to be processed may be retrieved from any number of sources (e.g., a hard disk 4, a removable storage drive 5, and/or a number of data sources accessible through network 7). One of skill in the are would readily see that computer system 1 is open to any number of configurations, is discussed for exemplary purposes, and is not meant to limit the invention to any particular embodiment.

The hierarchical visualization methodologies may be integrated with predictive analysis systems and software. For example, a predictive analysis tool may be applied to multi-dimensional data collected from the hotel industry. A hotel business may use the predictive analysis tool to obtain predictions regarding occupancy rates as a function of assorted factors (such as price, amenities, time of year, etc.). It is generally desirable to visualize the predicted occupancy rates in the context of the data. However, since the data includes many factors which may collectively affect the number of hotel customers, it is not possible (or at least practical) to present the multi-dimensional data in a single multi-dimensional view. It should be evident in view of the discussion above that the hierarchical visualization methodologies may be applied to identify a reduced-dimension visualization which would be suitable for studying the predicted occupancy rate. The reduced-dimension visualization of the hotel industry data may facilitate, for example, pseudo real-time selection of suitable prices by the hotel business which allow the hotel to achieve full occupancy while optimizing profitability.

The above specific embodiments are illustrative, and many variations can be introduced on these embodiments without departing from the spirit of the disclosure or from the scope of the appended claims. Elements and/or features of different illustrative embodiments may be combined with each other and/or substituted for each other within the scope of this disclosure and appended claims.

What is claimed is:

1. A method for hierarchical visualization of multi-dimensional data, comprising:
    receiving, with a computer processor, a multi-dimensional data set of data points dispersed into a plurality of categories, each respective category containing data points that share a common characteristic unique to the respective category;
    applying, with a computer processor, a first dimension-reduction process to the multi-dimensional data set to obtain a current dimension-reduced visualization of the multi-dimensional data set;
    displaying the current dimension-reduced visualization to a user, wherein displaying the current dimension-reduced visualization includes:
        indicating, for each of the data points in the data set, a location based on a first set of dimensions associated with the current visualization; and
        indicating a categorization of a plurality of the data points in the data set; receiving user input that graphically selects a user-defined region of the current visualization, wherein the selected region comprises a mixed region that contains data points of different categories, including a first data point and a second data point, wherein a location of the first data point in the current visualization and a location of a second data point in the current visualization are separated by a first distance;
    selecting, with a computer processor, a subset of the multi-dimensional data set, the subset including the data points contained within the selected region of the current dimension-reduced visualization;
    applying, with a computer processor, an additional dimension-reduction process to the selected subset of the multi-dimensional data set to obtain a subsequent visualization; and
    displaying the subsequent visualization to the user, wherein displaying the subsequent visualization includes indicating, for each of the data points located in the mixed region, a location based on a second set of dimensions associated with the subsequent visualization, and wherein a location of the first data point in the subsequent visualization and a location of the second data point in the subsequent visualization are separated by a second distance that is different from the first distance.

2. The method of claim 1, further comprising using the subsequent visualization as the current visualization and repeating the steps of claim 1 involving the present visualization to obtain a further subsequent visualization.

3. The method of claim 2, wherein each visualization has an associated angle of view and a view of the multi-dimensional data set is obtained at an angle of view associated with a selected one of the subsequent visualizations.

4. The method of claim 1, further comprising using the subsequent visualization as the current visualization and repeating the steps of claim 1 involving the present visualization until a subsequent dimension-reduced visualization having a desired level of separation of points is obtained.

5. The method of claim 4, wherein each visualization has an associated angle of view and a view of the multi-dimensional data set is obtained at an angle of view associated with the dimension-reduced visualization having the desired level of separation of points.

6. The method of claim 1, wherein the current visualization has a first angle of view, and the additional visualization has a second angle of view different from the first angle of view.

7. The method of claim 1, wherein the subsequent visualization is at a higher level of detail than the current visualization.

8. The method of claim 1, wherein the additional dimension-reduction process applies the same dimension reduction technique as used in the first dimension-reduction process.

9. The method of claim 1, wherein the first dimension-reduction process and the additional dimension reduction process apply respectively different dimension-reduction techniques.

10. The method of claim 1, wherein the additional dimension-reduction process includes applying a continuous dimension-reduction technique to obtain a sequence of dimension-reduced visualizations.

11. The method of claim 10 further comprising:
    selecting two data points in the multi-dimensional data set for distance estimation,
    wherein if the two data points appear to be separated by a distance in any one of the dimension-reduced visualizations, the two data points are separated by at least the distance in the original multi-dimensional space.

12. The method of claim 1 further comprising utilizing a hierarchical cluster tree to automate generation of hierarchical visualizations by generating a visualization for each node of the cluster tree.

13. The method of claim 1, wherein the subset corresponds to a mixed region.

14. The method of claim 1, wherein the multidimensional data set includes non-numeric data and is preprocessed into numerical form prior to dimension reduction.

15. The method of claim 1, wherein the subsequent visualization is consulted with data from a test set by applying a mapping corresponding to the additional dimension-reduction process.

16. The method of claim 1, wherein the method is applied to classify the multi-dimensional data set according to one or more features associated with the data set.

17. The method of claim 1, wherein the multi-dimensional data set is collected from a production process, and the method is applied to obtain information for predicting product properties.

18. The method of claim 1, wherein the multidimensional data set corresponds to data collected from a system, and the method is applied to obtain information for diagnosing a problem in the system.

19. The method of claim 1, wherein the multidimensional data set corresponds to data collected from a system, and the method is applied to obtain information for predicting a problem, before the problem develops in the system.

20. The method of claim 1, wherein the multidimensional data set corresponds to data collected from a system, and the method is applied to obtain information for optimizing the system.

21. The method of claim 1, wherein the multidimensional data set corresponds to data collected from a system, and the method is applied to obtain information for searching the system.

22. The method of claim 1, wherein the subsequent visualization enables the user to determine the proximity of at least one data point in the selected region relative to other of the data points in the selected region with a greater degree of accuracy than the current visualization.

23. The method of claim 1, wherein:
the selected region comprises a third data point of an unknown categorization; and
the subsequent visualization enables the user to visually determine whether the first data point is included in a first category based on visual proximity of the third data point to other of the data points included in the first category.

24. A method for hierarchical visualization of multi-dimensional data, comprising:
selecting two data points in a multi-dimensional data set for distance estimation,
(a) applying, with a computer processor, a first dimension-reduction process to the multi-dimensional data set to obtain a first visualization, the first visualization displaying a first reduced-dimension distance between the two data points;
(b) selecting, with the computer processor, a subset of the multi-dimensional data set associated with a selected region of the dimension-reduced first visualization where more detail is desired;
(c) applying, with the computer processor, a second dimension-reduction process to the selected subset of the multi-dimensional data set to obtain at least one additional visualization, the at least one additional visualization displaying a second reduced-dimension distance between the two data points;
(d) displaying one or more of the visualizations; and
wherein: if the two data points appear to be separated by a distance in any one of the dimension-reduced visualizations, the two data points are separated by at least the distance in the original multi-dimensional space;
at least one of the dimension reduction processes comprises a continuous dimension-reduction technique that includes principal component analysis; and
a largest one of the reduced-dimension distances is a lower bound estimate of an actual distance between the two selected data points in the original multidimensional space.

25. A non-transitory computer-readable medium encoded with a program of instructions executable by a computer to perform steps in a method for hierarchical visualization of multi-dimensional data, the method steps comprising:
receiving a multi-dimensional data set of data points dispersed into a plurality of categories, each respective category containing data points that share a common characteristic unique to the respective category;
applying a first dimension-reduction process to the multi-dimensional data set to obtain a current dimension-reduced visualization of the multi-dimensional data set;
displaying the current dimension-reduced visualization to a user, wherein displaying the current dimension-reduced visualization includes:
indicating, for each of the data points in the data set, a location based on a first set of dimensions associated with the current visualization; and
indicating a categorization of a plurality of the data points in the data set;
receiving user input that graphically selects a user-defined region of the current visualization, wherein the selected region comprises a mixed region that contains data points of different categories, including a first data point and a second data point, wherein a location of the first data point in the current visualization and a location of a second data point in the current visualization are separated by a first distance;
selecting a subset of the multi-dimensional data set, the subset including the data points contained within the selected region of the current dimension-reduced visualization;
applying an additional dimension-reduction process to the selected subset of the multi-dimensional data set to obtain a subsequent visualization; and
displaying the subsequent visualization to the user, wherein displaying the subsequent visualization includes indicating, for each of the data points located in the mixed region, a location based on a second set of dimensions associated with the subsequent visualization, and wherein a location of the first data point in the subsequent visualization and a location of the second data point in the subsequent visualization are separated by a second distance that is different from the first distance.

26. The non-transitory computer-readable medium of claim 25, further comprising using the subsequent visualization as the current visualization and repeating the steps of claim 25 involving the present visualization until a subsequent dimension-reduced visualization having a desired level of separation of points is obtained.

27. The non-transitory computer-readable medium of claim 25, further comprising using the subsequent visualization as the current visualization and repeating the steps of claim 25 involving the present visualization to obtain a further subsequent visualization.

28. A computer system, comprising:
a computer processor; and
a non-transitory computer-readable medium encoded with a program of instructions executable by the computer system to perform steps in a method for hierarchical visualization of multi-dimensional data, the method steps comprising:
receiving a multi-dimensional data set of data points dispersed into a plurality of categories, each respective category containing data points that share a common characteristic unique to the respective category;
applying a first dimension-reduction process to the multi-dimensional data set to obtain a current dimension-reduced visualization of the multi-dimensional data set;

displaying the current dimension-reduced visualization to a user, wherein displaying the current dimension-reduced visualization includes:

indicating, for each of the data points in the data set, a location based on a first set of dimensions associated with the current visualization; and indicating a categorization of a plurality of the data points in the data set;

receiving user input that graphically selects a user-defined region of the current visualization, wherein the selected region comprises a mixed region that contains data points of different categories, including a first data point and a second data point, wherein a location of the first data point in the current visualization and a location of a second data point in the current visualization are separated by a first distance;

selecting a subset of the multi-dimensional data set, the subset including the data points contained within the selected region of the current dimension-reduced visualization;

applying an additional dimension-reduction process to the selected subset of the multi-dimensional data set to obtain a subsequent visualization; and displaying the subsequent visualization to the user, wherein displaying the subsequent visualization includes indicating, for each of the data points located in the mixed region, a location based on a second set of dimensions associated with the subsequent visualization, and wherein a location of the first data point in the subsequent visualization and a location of the second data point in the subsequent visualization are separated by a second distance that is different from the first distance.

29. The computer system of claim 28, further comprising using the subsequent visualization as the current visualization and repeating the steps of claim 28 involving the present visualization until a subsequent dimension-reduced visualization having a desired level of separation of points is obtained.

30. The computer system of claim 28, further comprising using the subsequent visualization as the current visualization and repeating the steps of claim 28 involving the present visualization to obtain a further subsequent visualization.

31. A apparatus comprising a computer processor coupled to a memory wherein:

the memory receives a multi-dimensional data set of data points dispersed into a plurality of categories, each respective category containing data points that share a common characteristic unique to the respective category; and the computer processor programmed to perform the steps of:

applying a first dimension-reduction process to the multi-dimensional data set to obtain a current dimension-reduced visualization of the multi-dimensional data set;

displaying the current dimension-reduced visualization to a user, wherein displaying the current dimension-reduced visualization includes:

indicating, for each of the data points in the data set, a location based on a first set of dimensions associated with the current visualization; and indicating a categorization of a plurality of the data points in the data set;

receiving user input that graphically selects a user-defined region of the current visualization, wherein the selected region comprises a mixed region that contains data points of different categories, including a first data point and a second data point, wherein a location of the first data point in the current visualization and a location of a second data point in the current visualization are separated by a first distance;

selecting a subset of the multi-dimensional data set, the subset including the data points contained within the selected region of the dimension-reduced current visualization;

applying an additional dimension-reduction process to the selected subset of the multi-dimensional data set to obtain a subsequent visualization; and displaying the subsequent visualization to the user, wherein displaying the subsequent visualization includes indicating, for each of the data points located in the mixed region, a location based on a second set of dimensions associated with the subsequent visualization, and wherein a location of the first data point in the subsequent visualization and a location of the second data point in the subsequent visualization are separated by a second distance that is different from the first distance.

* * * * *